US011754126B2

(12) United States Patent
O'Brien et al.

(10) Patent No.: US 11,754,126 B2
(45) Date of Patent: Sep. 12, 2023

(54) DRIVE TRANSMISSION APPARATUS

(71) Applicants: Xtrac Limited, Thatcham (GB); Suzuki Motor Corporation, Hamamatsu (JP)

(72) Inventors: Torsten O'Brien, Newbury (GB); Daijiro Mashita, Hamamatsu (JP); Jon Marsh, Newbury (GB); Paul Pomfret, Thatcham (GB); Richard Gostick, Reading (GB); Jamie Rusbridge, Newbury (GB)

(73) Assignees: Xtrac Limited, Thatcham (GB); Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 17/493,424

(22) Filed: Oct. 4, 2021

(65) Prior Publication Data

US 2022/0106989 A1 Apr. 7, 2022

(30) Foreign Application Priority Data

Oct. 5, 2020 (EP) .................................... 20200101

(51) Int. Cl.
*F16D 11/14* (2006.01)
*F16D 11/10* (2006.01)
(Continued)

(52) U.S. Cl.
CPC .............. *F16D 11/10* (2013.01); *F16D 11/14* (2013.01); *F16H 63/36* (2013.01); *F16D 2011/008* (2013.01); *F16H 2063/3093* (2013.01)

(58) Field of Classification Search
CPC ......... F16H 3/20–40; F16H 2063/3093; F16D 11/10; F16D 11/14; F16D 2011/008
See application file for complete search history.

(56) References Cited

U.S. PATENT DOCUMENTS

| | | | |
|---|---|---|---|
| 1,618,470 | A | 2/1927 | Patterson |
| 6,112,873 | A | 9/2000 | Prasse et al. |

(Continued)

FOREIGN PATENT DOCUMENTS

| | | |
|---|---|---|
| JP | H04-64617 U | 6/1992 |
| JP | A-2020-143732 | 9/2020 |

OTHER PUBLICATIONS

Machine translation of JP 04064617 U (Year: 1992).*

(Continued)

*Primary Examiner* — David R Morris
(74) *Attorney, Agent, or Firm* — Lippes Mathias LLP

(57) ABSTRACT

A drive transmission apparatus includes a dog clutch including a dog gear assembly and a dog ring, which are configured for rotation and relative axial adjustment between an engaged condition in which torque can be transmitted and a disengaged condition. The dog gear assembly includes a dog gear, a retractable dog assembly configured for movement relative to the dog gear between an extended position and a retracted position, and a control element that controls movement of the retractable dog assembly. The dog ring includes a plurality of first dogs and the dog gear assembly includes a plurality of second dogs that engage the first dogs in the engaged condition, and that are disengaged from the first dogs in the disengaged condition. The second dogs include a plurality of fixed dogs that are mounted on the dog gear and a plurality of retractable dogs of the retractable dog assembly.

20 Claims, 14 Drawing Sheets

20 22 50 49 33 26a 46a 46b 42 40 38 46b 24 44 36 30 26 52 35 32 28 Z 34

(51) Int. Cl.

| | |
|---|---|
| ***F16H 63/36*** | (2006.01) |
| *F16D 11/00* | (2006.01) |
| *F16H 63/30* | (2006.01) |

(56) References Cited

U.S. PATENT DOCUMENTS

| | | | | |
|---|---|---|---|---|
| 2007/0034032 | A1* | 2/2007 | Moore .................... | F16H 63/30<br>74/339 |
| 2018/0045252 | A1 | 2/2018 | Omori | |
| 2019/0242442 | A1 | 8/2019 | Shiotsu et al. | |
| 2020/0284302 | A1* | 9/2020 | Inaba ...................... | F16D 11/10 |

OTHER PUBLICATIONS

Extended European Search Report dated Feb. 4, 2021 for EP Application No. 20200101.2.

English Translation of Japanese Office Action issued on Japanese Application No. 2021-163385, dated Jan. 30, 2023, 3 pps.

* cited by examiner

GEARCHANGE SCENERIO:
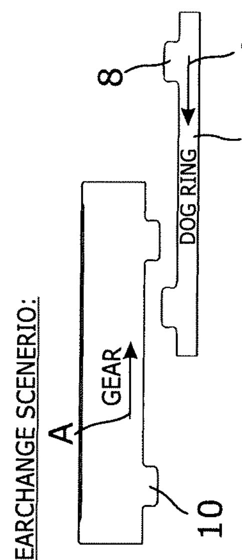
Fig. 3a
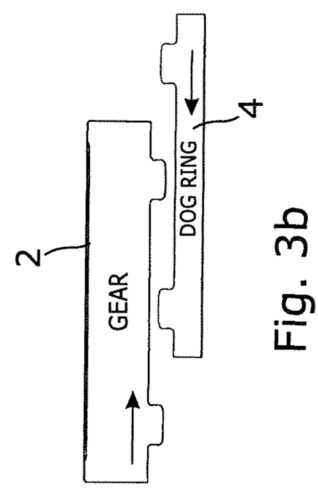
Fig. 3b
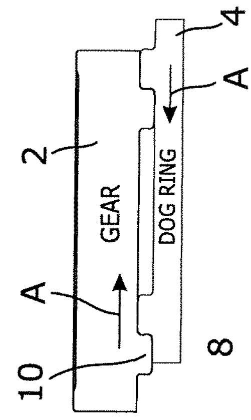
Fig. 3c
CHANGE OF DRIVING DIRECTION (E.G THROTTLE TO BRAKE):
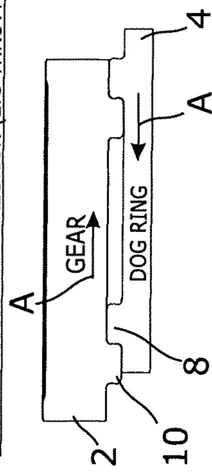
Fig. 3d
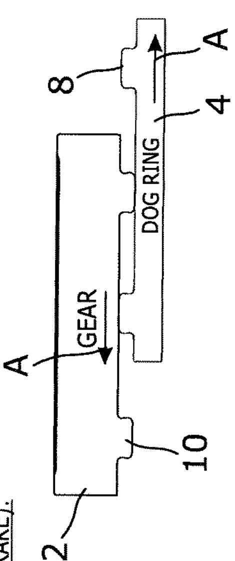
Fig. 3e
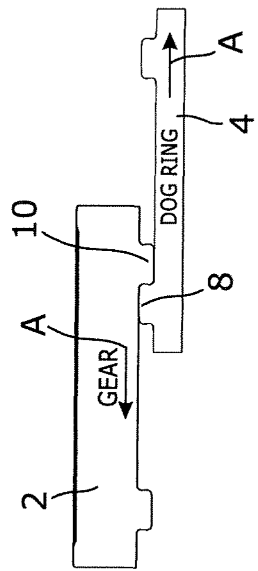
Fig. 3f
Fig. 3
PRIOR ART

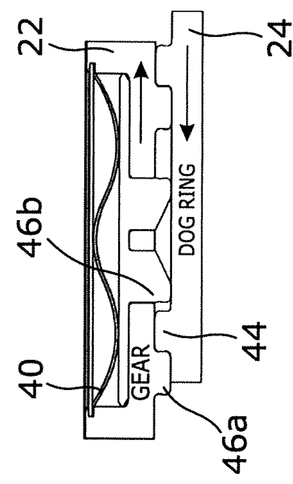
Fig. 6c
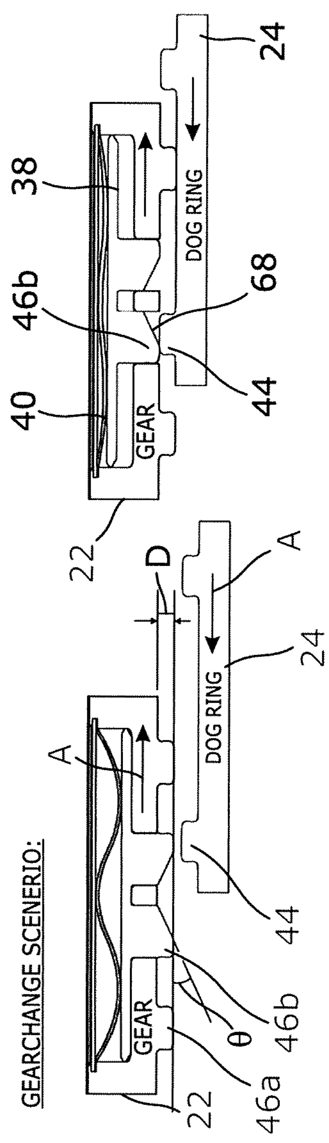
Fig. 6b
Fig. 6a
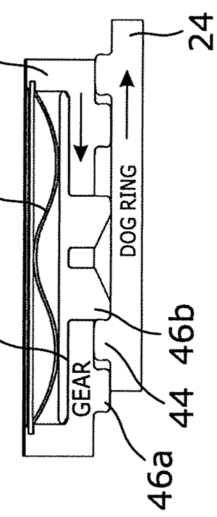
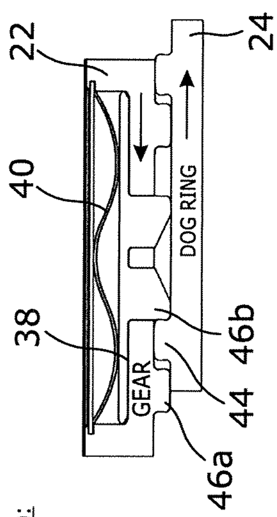
Fig. 6e
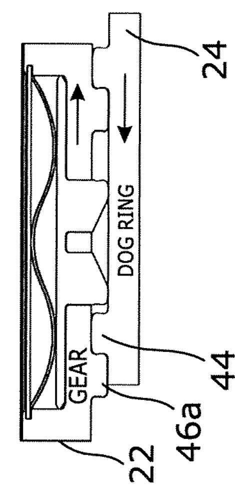
Fig. 6d 42
40
38
46b
46b
36
35
52
50
22
46a
30
26
28
49
26a
34
20
32
33
Z
24
44

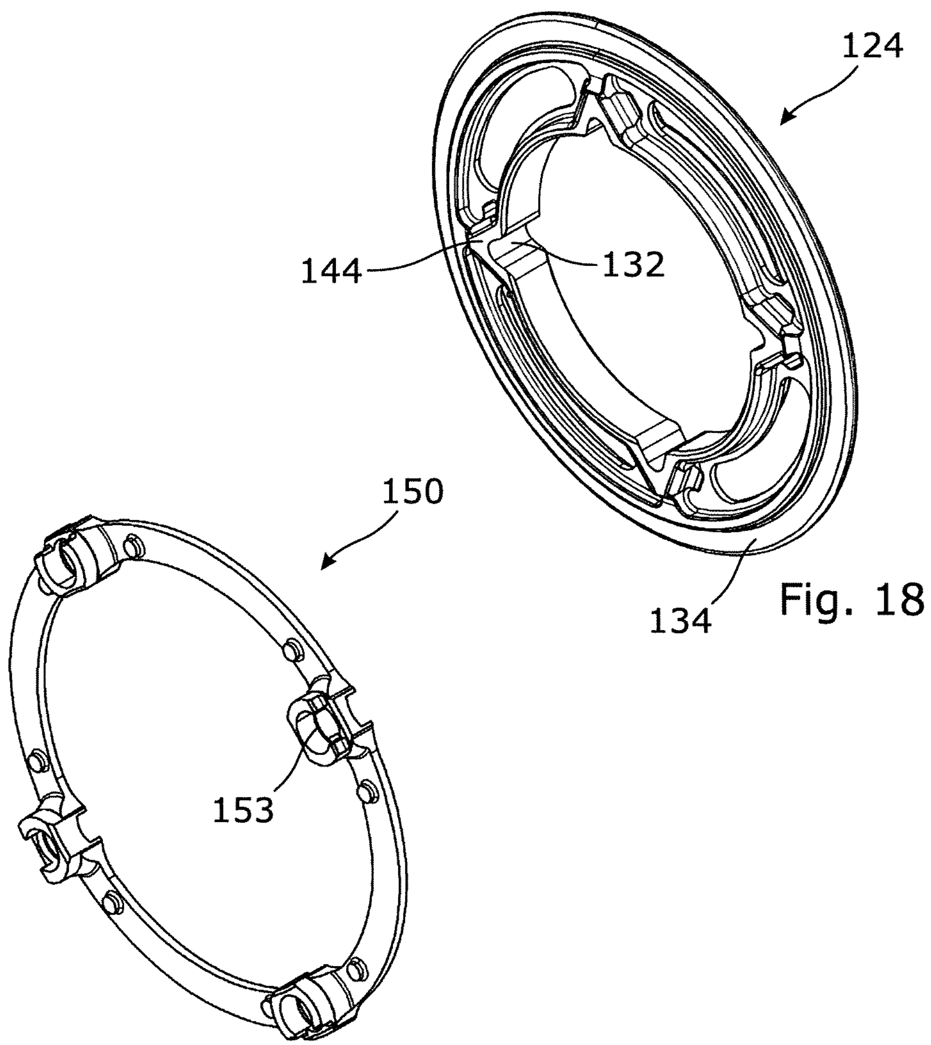
Fig. 18
Fig. 19
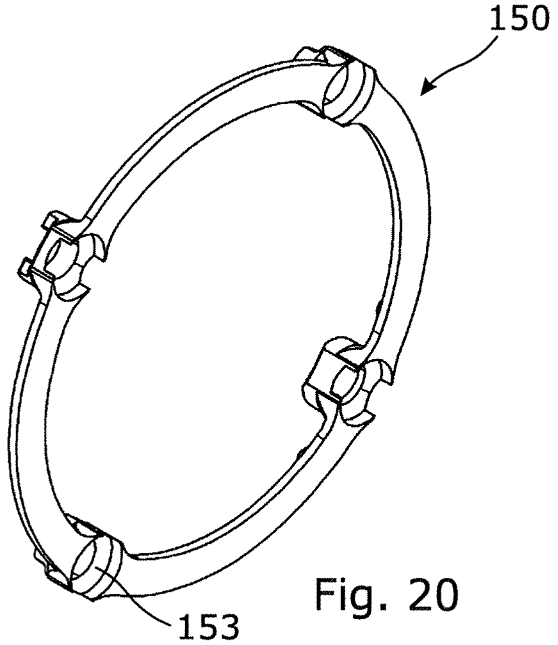
Fig. 20

DRIVE TRANSMISSION APPARATUS

CROSS-REFERENCE TO RELATED APPLICATION

This application claims foreign priority under 35 USC § 119 to European Application No. 20200101.2 filed Oct. 5, 2020, the entire disclosure of which is hereby expressly incorporated by reference into the present specification.

FIELD

The present invention relates to a drive transmission apparatus. In particular but not exclusively the invention relates to a drive transmission apparatus comprising a dog clutch, and to a transmission system that includes such a drive transmission apparatus.

BACKGROUND

A dog clutch is a mechanism for controlling the drive connection between a gear and a drive shaft so that when the dog clutch is engaged rotary drive is transmitted between the gear and the drive shaft, and when the dog clutch is disengaged the gear can rotate freely around the drive shaft without transmitting rotary drive. The drive shaft could be either the mainshaft or the layshaft of a gearbox, depending on the type of gearbox. A dog clutch is typically used in a drive transmission system, for example a dog gear box, that is used in a vehicle to control the transmission of drive between the engine and the wheels.

A conventional dog clutch is illustrated in FIGS. 1-3. The dog clutch includes a dog gear 2 and a dog ring 4, which are mounted on a drive shaft (not shown). The dog gear 2 can rotate freely around the drive shaft, whereas the dog ring 4 has a plurality of drive formations 6 in the form of grooves on its inner circumference, which engage complementary drive formations in the form of splines on the drive shaft, so that the dog ring 4 is compelled to rotate with the drive shaft. The drive formations also allow the dog ring 4 to slide axially relative to the drive shaft between an engaged position in which it engages the dog gear 2, and a disengaged position in which it is disengaged from the dog gear 2. This axial movement is conventionally controlled by a selector mechanism (not shown), for example a selector fork, that engages a radial flange 12 on the outer circumference of the dog ring 4. The dog gear 2 carries a set of gear teeth 14 on its outer circumference for transmitting drive to another gear (not shown).

The dog ring 4 carries a set of first dogs 8 and the dog gear 2 carries a set of second dogs 10. The first and second dogs 8, 10 can be bought into engagement with one another by moving the dog ring 4 axially to the engaged position, so that torque and rotary drive is transferred between the drive shaft, the dog ring 4 and the dog gear 2. Alternatively, the dog ring 4 can be moved to the disengaged position, so that torque and rotary drive is not transferred between the dog ring 4 and the dog gear 2. The dog gear 2 can then rotate freely around the drive shaft.

Operation of a conventional dog clutch is illustrated in FIGS. 3*a*-3*f*, in which the dog gear 2 and the dog ring 4 are depicted schematically and are shown in a developed linear view to show the relative positions of the dog gear 2 and the dog ring 4 during operation.

FIGS. 3*a*-3*c* show the relative positions of the dog gear 2 and the dog ring 4 during a gear change, as the dog ring 4 is brought from a disengaged position into engagement with the dog gear 2. In FIG. 3*a* the dog ring 4 is in a disengaged position and the first dogs 8 on the dog ring 4 are spaced axially from the second dogs 10 on the dog gear 2. Relative rotational movement between the dog gear 2 and the dog ring 4 is illustrated by the direction of the load/direction arrows A.

In FIG. 3*b* the dog ring 4 has been shifted partially towards the engaged position, and in FIG. 3*c* it has been shifted fully to the engaged position. Owing to the relative rotation between the dog gear 2 and the dog ring 4 the first and second sets of dogs 8, 10 now engage one another, transmitting torque and rotary drive between the dog gear 2 and the dog ring 4.

In order to engage successfully, the first and second dogs 8, 10 must mesh as illustrated in FIG. 3*c*. If the dog gear 2 and the dog ring 4 are not correctly aligned during axial movement of the dog ring towards the engaged position, the first and second dogs 8, 10 can come into contact with each other before the dog clutch is fully engaged, which can result in the gear change being delayed or rejected. Providing a large gap between the dogs reduces this risk and increases the chance that the dogs will mesh correctly.

However, a disadvantage of providing a large gap between the dogs is that this can cause shock loadings within the transmission system when the direction of torque transmitted through the dog clutch is reversed, for example when the throttle is lifted, causing engine braking. This is illustrated in FIGS. 3*d*-3*f*. In FIG. 3*d* drive is being transmitted through the dog clutch in a first direction, the direction of load being illustrated by the load/movement arrows A. In FIGS. 3*e* and 3*f* the direction of load is reversed, causing the dog gear 2 and the dog ring 4 to rotate in opposite directions until the dogs 8, 10 come into contact to transmit torque in the opposite direction, as shown in FIG. 3*f*.

During the relative rotation of the dog gear 2 and the dog ring 4 from the position shown in FIG. 3*d* to that shown in FIG. 3*f*, a substantial difference in rotational speed can arise between the components of the transmission system, leading to a large shock loading when the dogs re-engage. This can lead to an uncomfortable drive experience for passengers of the vehicle and may cause wear or damage to the transmission system.

Therefore, in a conventional dog clutch the spacing between the dogs is chosen to provide a compromise between reducing the risk of unsuccessful engagement of the dog clutch, and reducing the shock loading within the drive transmission when the direction of transmitted torque is reversed. However, such a compromise is never entirely satisfactory.

US2019/0242442A1 describes a modified dog clutch that seeks to address the disadvantage described above. However, the mechanism described in US2019/0242442A1 is complex and expensive to manufacture, and requires the provision of cam grooves on the power transmission shaft. The mechanism is not suitable for use in existing, conventional transmission systems.

JP H04-64617 U describes a dog clutch in which the dog gear comprises a plurality of fixed dogs and a plurality of retractable dogs, which can limit relative rotational movement of the dog gear and the dog ring when the torque is reversed.

SUMMARY

It is an object of the present invention to provide a drive transmission apparatus comprising a dog clutch that mitigates one or more of the disadvantages described above, while avoiding the complexity of the dog clutch described in the US2019/0242442A1.

According to one aspect of the present invention there is provided a drive transmission apparatus comprising a dog clutch, the dog clutch comprising:

a dog gear assembly, and a dog ring, wherein the dog gear assembly and the dog ring are configured for rotation about a rotational axis, and for relative axial adjustment between an engaged condition in which torque can be transmitted between the dog gear assembly and the dog ring, and a disengaged condition in which torque cannot be transmitted, wherein the dog gear assembly includes:

a dog gear, a retractable dog assembly configured for movement relative to the dog gear between an extended position and a retracted position, and a control element that controls movement of the retractable dog assembly, wherein the dog ring comprises a plurality of first dogs, and the dog gear assembly comprises a plurality of second dogs, wherein the second dogs are configured to engage the first dogs in the engaged condition to transmit torque between the dog ring and the dog gear assembly, and are to be disengaged from the first dogs in the disengaged condition, so that they do not transmit torque said second dogs including a plurality of fixed dogs that are mounted on the dog gear, and a plurality of retractable dogs that comprise the retractable dog assembly.

In one embodiment, each retractable dog has a torque drive face that is configured to transmit torque to the dog ring when engaged with a first dog, and a cam face that is configured to drive movement of the retractable dog assembly towards the retracted position when engaged with a first dog, whereby relative rotation between the dog ring and the dog gear assembly causes the engaged first dog to slide over the cam face of the engaged retractable dog, driving movement of the retractable dog assembly towards the retracted position.

When the retractable dog assembly is in the extended position and the dog clutch is in an engaged condition, the retractable dogs limit relative rotation between the dog ring and the dog gear assembly when the direction of drive transmitted through the dog clutch reverses. This reduces shock loadings and makes the dog clutch smoother and more comfortable in operation.

When the dog clutch is changing from a disengaged condition to an engaged condition the retractable dog assembly can move to the retracted position if it is engaged by the first dogs, so that it does not impede engagement of the dog clutch.

The dog clutch therefore reduces shock loadings without increasing the risk of a gear change being rejected.

In one embodiment, the retractable dog assembly is configured for axial movement relative to the dog gear between an extended position and a retracted position, and the control element is configured to control axial movement of the retractable dog assembly. Alternatively, the retractable dog assembly may be configured for non-axial movement relative to the dog gear between the extended position and the retracted position, for example through movement of the retractable dogs in a radial or circumferential direction, etc. In this case, the control element is configured to control movement of the retractable dogs in the required direction between the extended position and the retracted position.

In an embodiment, the fixed dogs and the retractable dogs extend axially a substantially equal distance from the dog gear when the retractable dog assembly is in the extended position. This ensures that the fixed dogs and the retractable dogs are equally capable of transmitting torque through the dog clutch.

In an embodiment, the retractable dog assembly is configured such that torque can be transmitted between the retractable dogs and the first dogs when the retractable dog assembly is in the extended position, and torque cannot be transmitted between the retractable dogs and the first dogs when the retractable dog assembly is in the retracted position.

In an embodiment, each retractable dog has a torque drive face that is configured to transmit torque to the dog ring when engaged with a first dog, and a cam face that is configured to drive movement (optionally, axial movement) of the retractable dog assembly towards the retracted position when engaged with a first dog.

When a first dog engages a cam face during engagement of the dog clutch, relative rotation between the retractable dog and the first dog displaces the retractable dog towards the retracted position so that it does not hinder rotation of the dog ring relative to the dog gear assembly. This helps to ensure that the retractable dogs do not hinder engagement of the dog clutch. However, when the retractable dogs are in the extended position they are able to transmit torque/drive by engagement of the torque drive face with the first dogs.

Optionally, in an embodiment, the torque drive face is substantially perpendicular to a transverse plane of the dog clutch, enabling it to transmit drive/torque.

In an embodiment, the cam face is inclined relative to a transverse plane of the dog clutch, so that relative rotation of the dog ring and the dog gear assembly drives the retractable dog towards the retracted position. Generally, the cam face is inclined relative to a transverse plane of the dog clutch at an acute angle θ that is effective and distinct from the prior art, taking into account errors. In an embodiment, the cam face is inclined relative to a transverse plane of the dog clutch at an acute angle θ that is greater than 0° and less than 90°. Optionally, the angle θ is in the range 1°-85°, or optionally 5°-85°, or optionally 10°-50°, or optionally 20°-40°.

In an embodiment, the retractable dogs are asymmetric and are arranged in pairs, wherein the torque drive faces comprise outer faces of each pair of retractable dogs, and the cam faces comprise inner faces of each pair of retractable dogs. The retractable dogs forming each pair can optionally be interconnected so that they move in unison between the extended and retracted positions.

In an embodiment, the retractable dogs are located between adjacent fixed dogs. Optionally, each pair of retractable dogs is located between an adjacent pair of fixed dogs.

In an embodiment, each retractable dog extends through a pocket in the drive gear, optionally in a direction substantially parallel to the rotational axis. The pocket may support the retractable dog, allowing it to move between the extended and retracted positions but preventing any other movement of the retractable dog relative to the drive gear.

In an embodiment, the retractable dog assembly comprises a support element, and the retractable dogs are mounted on the support element. In this embodiment, the retractable dogs move in unison between the extended position and the retracted position.

Optionally, in an embodiment, the control element is configured to control movement of the support element. The control element therefore controls movement of all the retractable dogs in unison between the extended position and the retracted position.

In another embodiment, the retractable dogs are configured to move independently of one another between the extended position and the retracted position. Optionally, in an embodiment, the control element may be configured to control axial movement of the retractable dogs individually.

In an embodiment, the control element comprises a resilient biasing means that urges the retractable dog assembly towards the extended position. A control element may for example comprise a spring, for example a wave spring, a helical spring or a Belville washer, or an elastomeric element such as a rubber block, or it may comprise a pneumatic spring.

In an alternative embodiment the control element comprises an actuator that is operable to control movement of the retractable dog assembly between the extended position and the retracted position, for example in the axial direction. The actuator may for example be a mechanical, electrical or hydraulic actuator, which allows the position of the retractable dog assembly to be controlled directly, for example by a computer control system.

In an embodiment the dog gear includes a recess that accommodates the retractable dog assembly, providing a compact assembly.

Optionally, in an embodiment, the dog clutch further comprises a retaining element, for example a retaining ring, that retains the retractable dog assembly within the recess.

According to another aspect of the invention there is provided a transmission system including a drive transmission apparatus according to any one of the preceding statements of invention and a drive shaft that is rotatable about a shaft axis, wherein the dog gear assembly and the dog ring are configured for rotation about the shaft axis, the dog gear assembly is rotatable relative to the drive shaft, and the dog ring is configured for rotation with the drive shaft. The transmission system may for example be part of the drive transmission system of a vehicle, which transmits drive between the engine and the wheels.

In an embodiment the drive shaft and the dog ring include mutual drive formations that permit relative axial movement between the dog ring and the drive shaft and prevent relative rotation between the dog ring and the drive shaft.

Optionally, in an embodiment the transmission system includes a selector mechanism that controls relative axial movement between the dog ring and the drive shaft between the engaged condition and the disengaged condition.

BRIEF DESCRIPTION OF THE DRAWINGS

Certain embodiments of the present invention will now be described by way of example with reference to the accompanying drawings wherein:

FIGS. 3*a* to 3*f* (together defining FIG. 3) are developed linear schematic views of the conventional dog clutch, showing the relative positions of the dog gear and the dog ring during operation of the dog clutch;

FIGS. 4-14 illustrate a first dog clutch according to an embodiment of the invention, wherein;

FIGS. 4 and 5 are isometric views from the front and rear of a dog gear and a dog ring;

FIGS. 6*a* to 6*e* are developed linear schematic views showing operation of the first dog clutch;

FIG. 7 is an exploded isometric view of the first dog clutch;

FIGS. 8 and 9 are isometric front and rear views of a dog gear;

FIGS. 10 and 11 are isometric front and rear views of a retractable dog assembly;

FIG. 12 is an isometric view of a dog ring;

FIG. 13 is an isometric view of a control element;

FIG. 14 is an isometric view of a retaining element;

FIGS. 15 to 24 illustrate a second dog clutch according to an embodiment of the invention, wherein;

FIG. 15 is an exploded isometric view of the second dog clutch;

FIGS. 16 and 17 are isometric front and rear views of a dog gear;

FIG. 18 is an isometric view of a dog ring;

FIGS. 19 and 20 are front and rear isometric views of a retaining element;

FIGS. 21 and 22 are front and rear isometric views of a set of retractable dogs;

FIG. 23 is an isometric view of a set of springs, and

FIG. 24 is an isometric view of a set of retaining elements.

DETAILED DESCRIPTION

Figure 2:
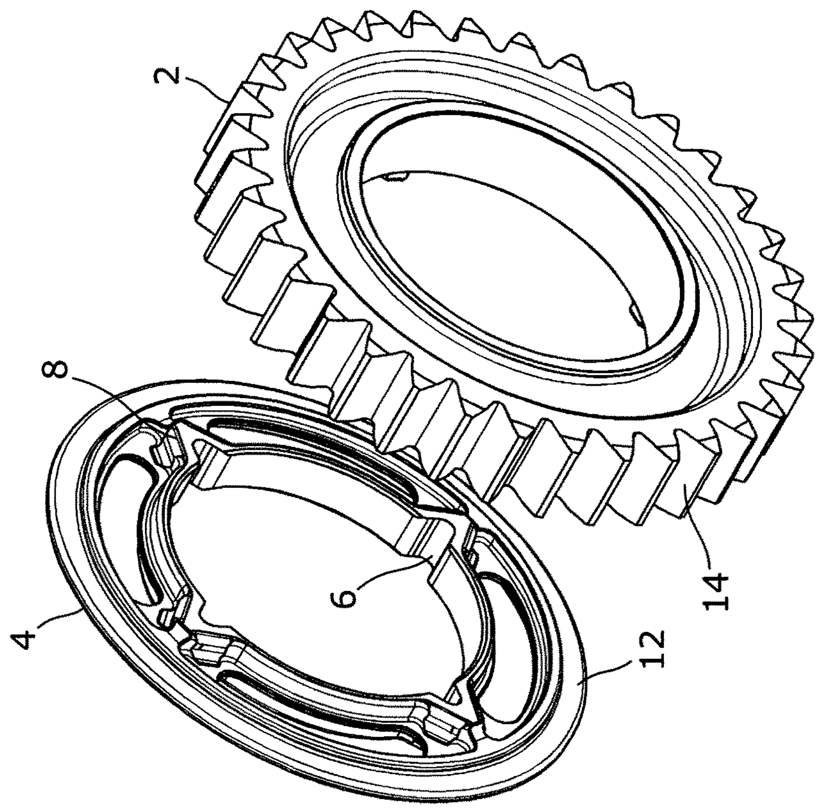
FIGS. 1 and 2 are isometric views from the front and rear of a dog gear and a dog ring, forming part of a conventional dog clutch.
Figure 1:
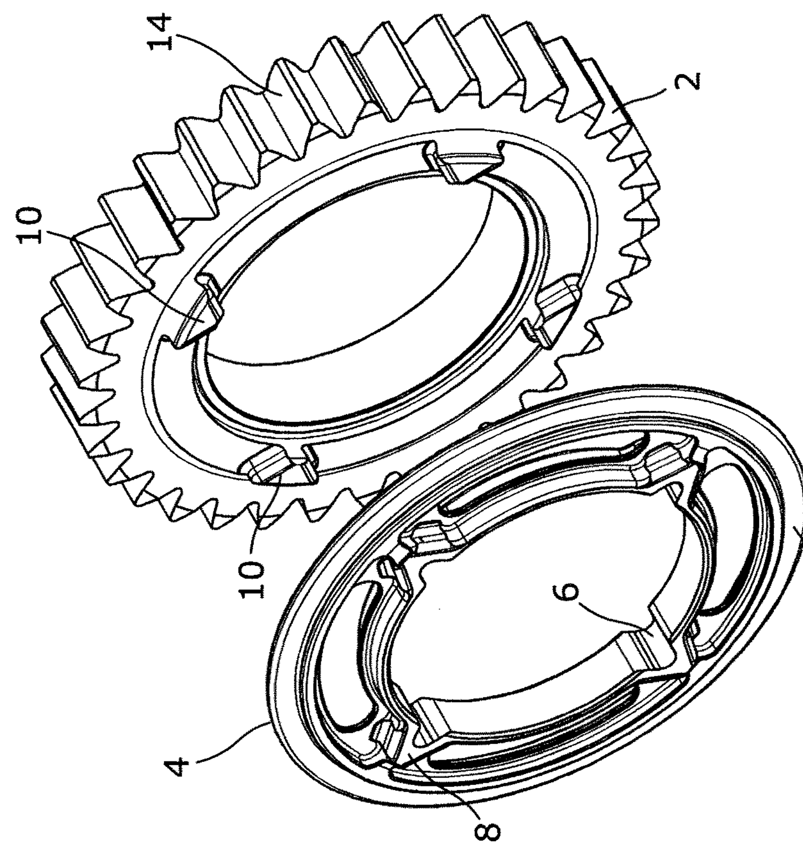
Figure 5:
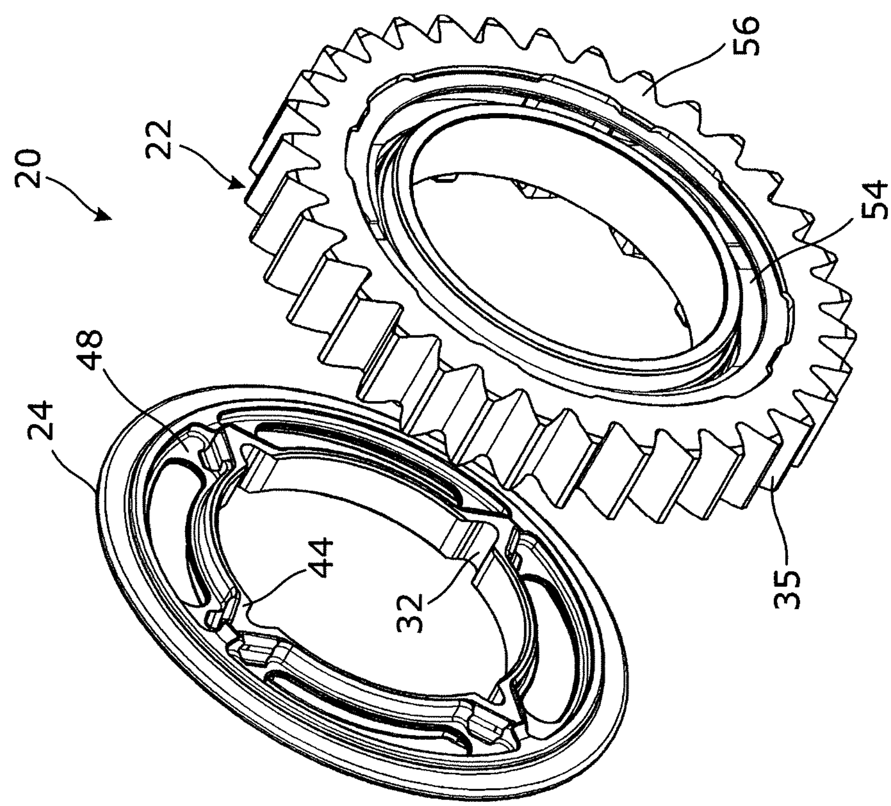
Figure 4:
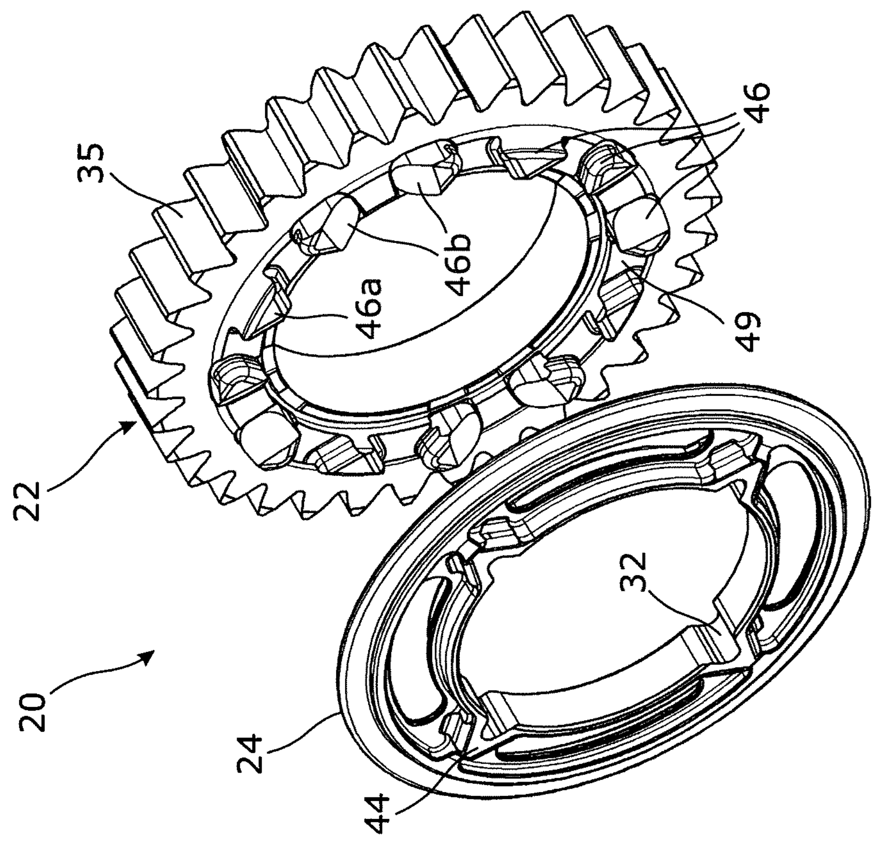
Figure 7:
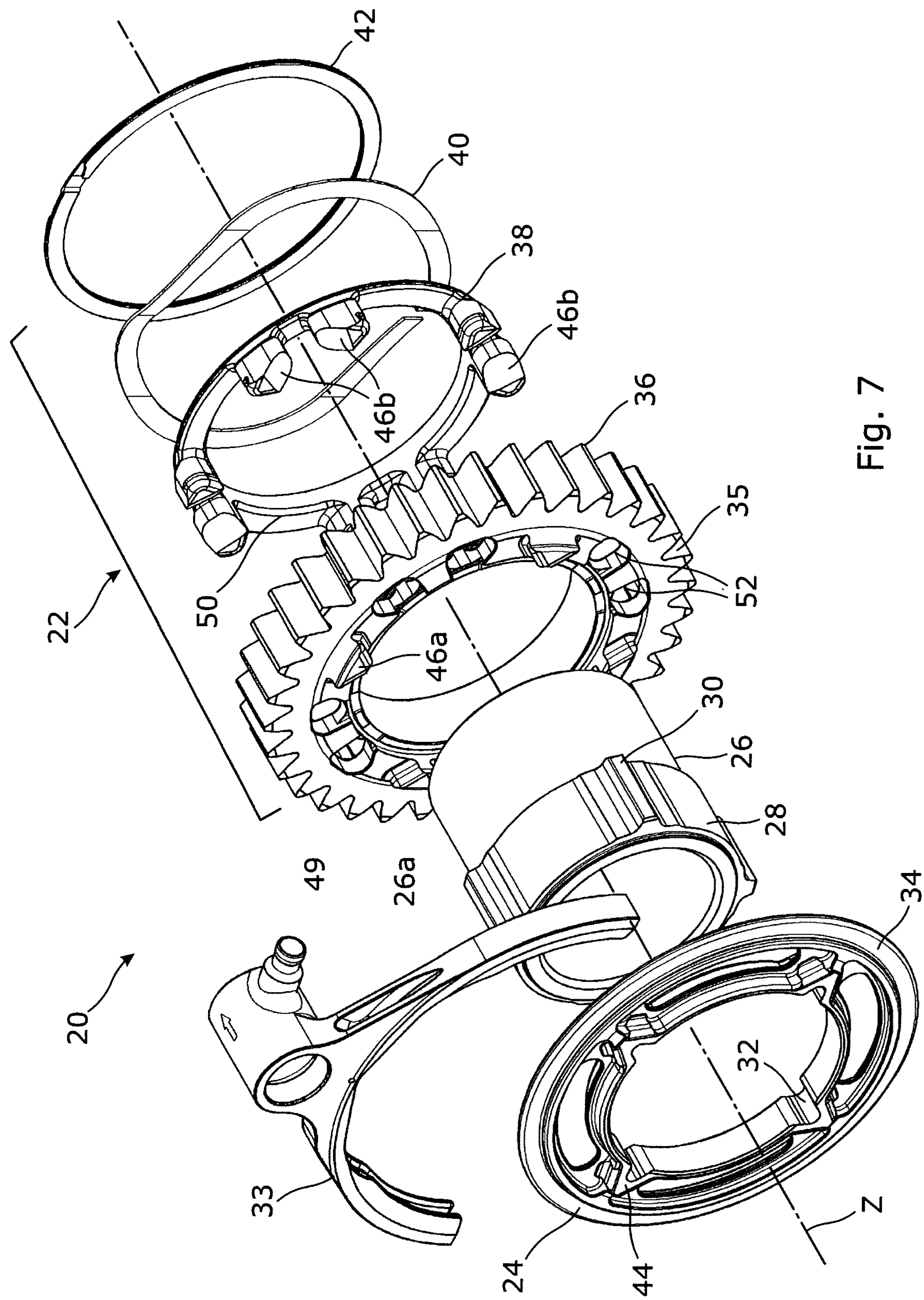
Figure 8:
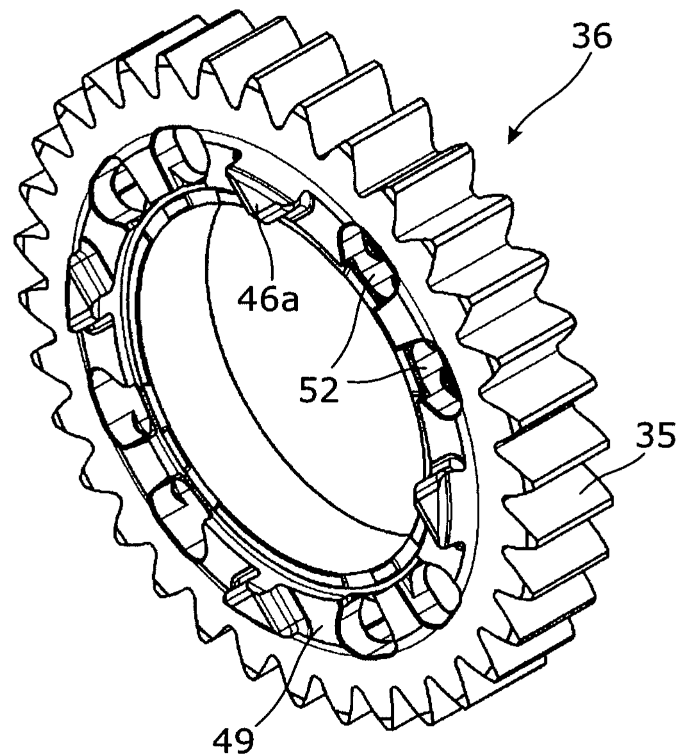
Figure 9:
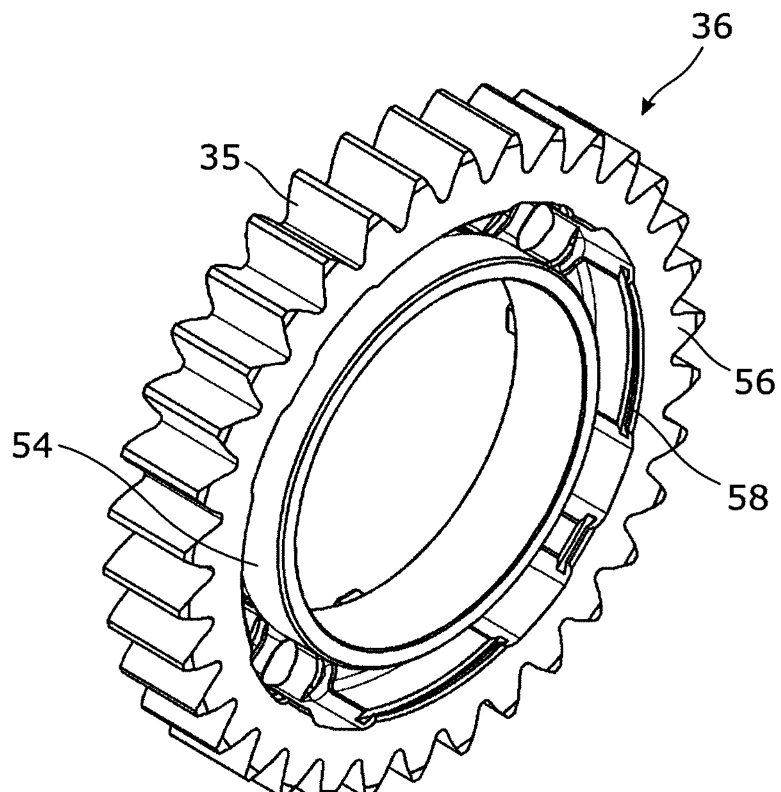

A drive transmission apparatus comprising a first dog clutch 20 according to an embodiment of the invention is illustrated in FIGS. 4 to 14. The first dog clutch 20 includes a dog gear assembly 22 and a dog ring 24, which are mounted on a rotary drive shaft 26. The drive shaft 26 may be either the mainshaft or the layshaft of a gearbox, depending on the type of gearbox. The rotary drive shaft 26 carries a hub 28, which has a plurality of first drive formations 30, for example splines or other formations, on its outer circumference. The first drive formations 30 engage complementary second drive formations 32, for example grooves or other formations, on the inner circumference of the dog ring 24. The first and second drive formations compel the dog ring 24 to rotate with the drive shaft 26 but allow relative axial movement between the dog ring 24 and the drive shaft 26. This axial movement is controlled by a selector mechanism 33, for example a selector fork, that engages a radial flange 34 on the outer circumference of the dog ring 24. The dog gear assembly 22 carries a set of gear teeth 35 for transmitting drive to another gear (not shown).

In this embodiment, the dog gear assembly 22 is mounted on a plain part 26*a* of the drive shaft 26 that has no drive formations, and is configured to rotate freely relative to the drive shaft 26. Optionally, the dog gear assembly 22 could be mounted on a bearing (not shown) allowing free rotation relative to the drive shaft 26. The dog gear assembly 22 includes a dog gear 36, a retractable dog assembly 38, a control element 40, which in this embodiment comprises a wave spring, and a retaining element 42, which in this embodiment comprises a spiral retaining ring.

The dog ring 24 carries a set of first dogs 44 and the dog gear assembly 22 carries a set of second dogs 46, which are engageable with the first dogs 44 to transmit rotary drive and torque between the dog ring 24 and the dog gear assembly 22. In this embodiment the first dogs 44 and the second dogs, 46 are substantially triangular in cross section and extend in an axial direction from respective end faces 48, 49 of the dog ring 24 and the dog gear 36. In this embodiment the apexes of the first dogs 44 point radially outwards and the apexes of the second dogs 46 point radially inwards. The first and second dogs 44, 46 thus have complementary shapes enabling respective faces of the dogs to transmit torque and rotary drive between the dog ring 24 and the dog gear assembly 22. The first and second dogs 44, 46 may however have alternative cross sectional shapes (for example square, trapezoidal etc.).

The set of second dogs 46 includes a plurality of fixed dogs 46*a* that extend axially from the end face 49 of the dog gear 36, and a plurality of retractable dogs 46*b* that comprise part of the retractable dog assembly 38. The retractable dogs 46*b* are mounted on an annular support element 50, which in this embodiment comprises an annular ring that is made for example of steel. The annular support element 50 may however be made of other materials and have different shapes. The retractable dogs 46*b* extend axially (i.e. in a direction parallel to the rotational axis Z of the drive shaft 26) from the annular support element 50 towards the dog ring 24. Optionally, the fixed dogs and the retractable dogs extend axially a substantially equal distance D from the dog gear when the retractable dog assembly is in the extended position, as illustrated in FIG. 6*a.*

In this embodiment, the retractable dog assembly 38 comprises eight retractable dogs 46*b*, which are arranged in four pairs 51 of dogs. The retractable dogs 46*b* are aligned with pockets 52 that extend axially through the dog gear 36 and are configured to move axially with the annular support element 50 between an extended position in which they extend axially beyond the end face 49 of the dog gear 36, and a retracted position in which they are positioned substantially flush with or below the end face 49 of the dog gear 36. When the retractable dogs 46*b* are in the extended position they are able to engage the first dogs 44 provided on the dog ring 24. When the retractable dogs 46*b* are in the retracted position, they cannot engage the first dogs 44.

The axial position of the retractable dog assembly 38 relative to the dog gear 36 is controlled by a control element 40, which in this embodiment is a resilient control element comprising an annular wave spring. The control element 40 may alternatively take a number of different forms. For example, it may comprise a different resilient element such as a Belleville spring or a pneumatic spring, or it may comprise an actuator, which may be pneumatically, mechanically or electromagnetically controlled.

In this embodiment the control element 40 comprises a resilient control element, which is compressed axially between the annular support element 50 and the retaining element 42. The retractable dog assembly 38, the control element 40 and the retaining element 42 are all accommodated within an annular recess 54 provided in a rear face 56 of the dog gear 36. The retaining element 42 engages a groove 58 provided in the inwards-facing circumference of the annular recess 54. The resilient control element 40 urges the retractable dog assembly 38 axially towards the extended position, in which the retractable dogs 46*b* can engage the first dogs 44 on the dog ring 24.

Figure 10:
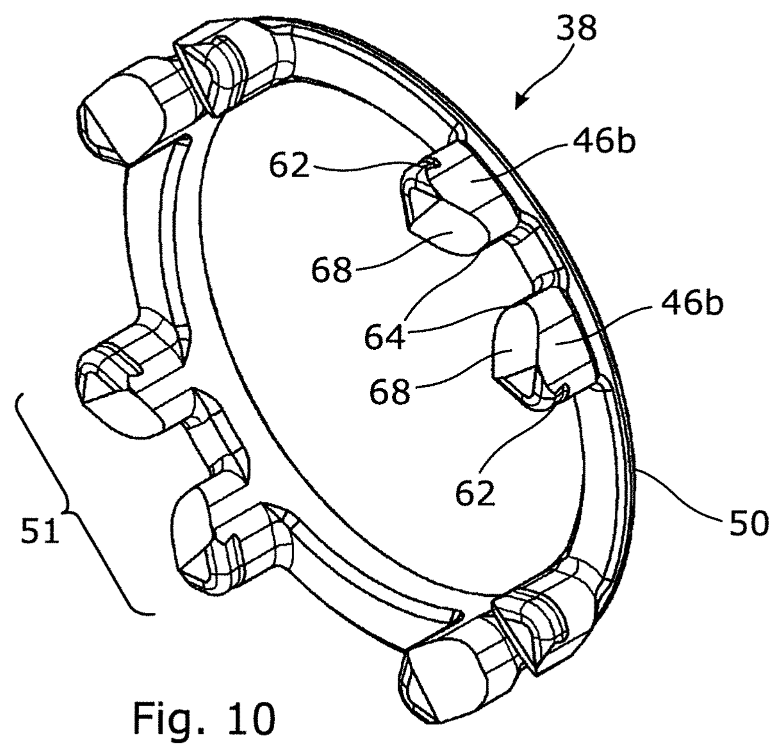
Figure 11:
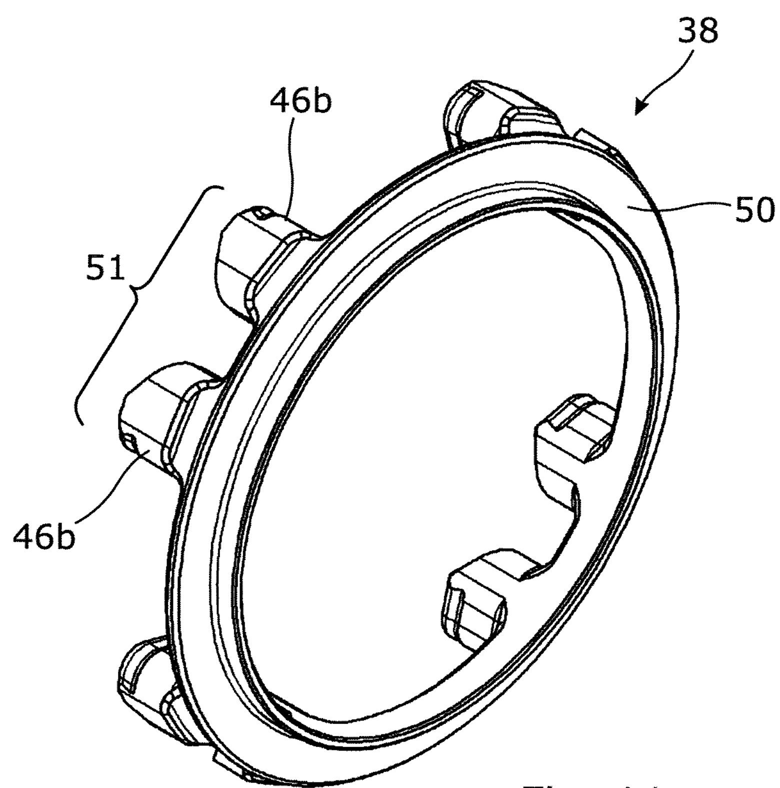
Figure 12:
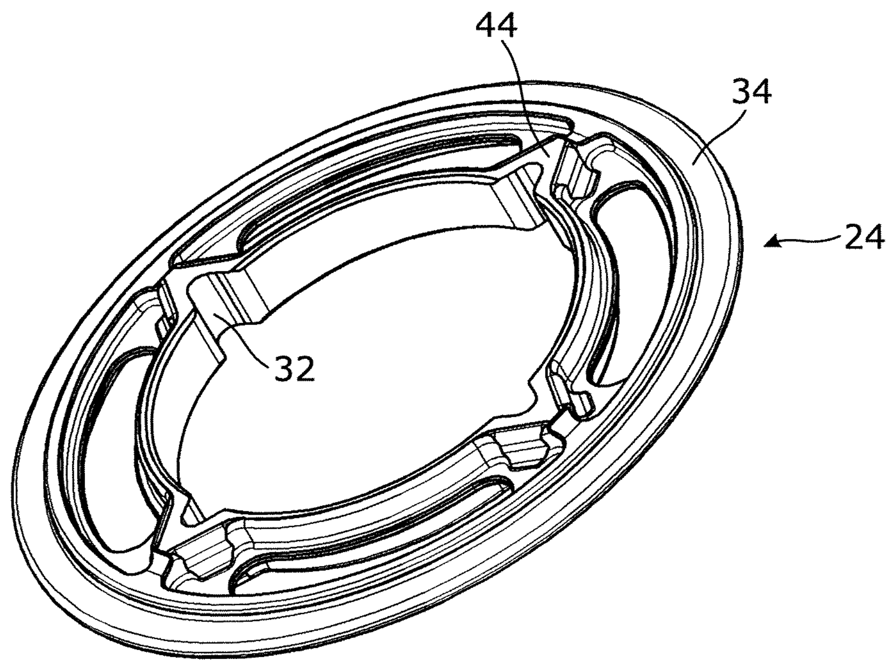
Figure 13:
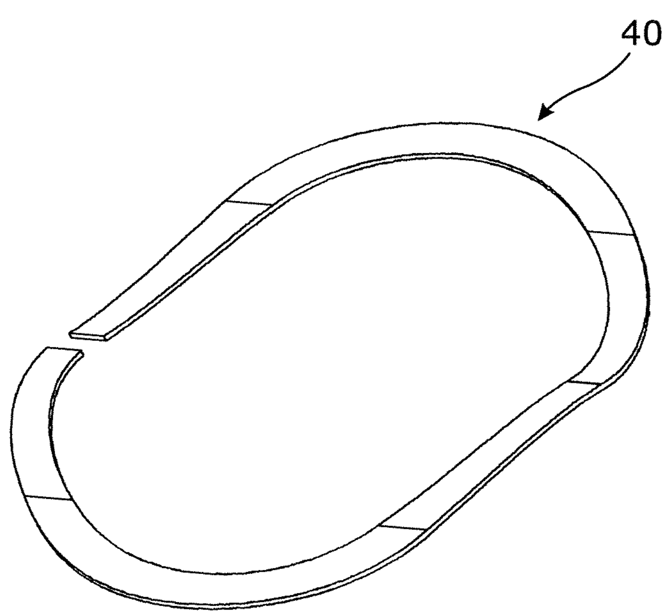
Figure 14:
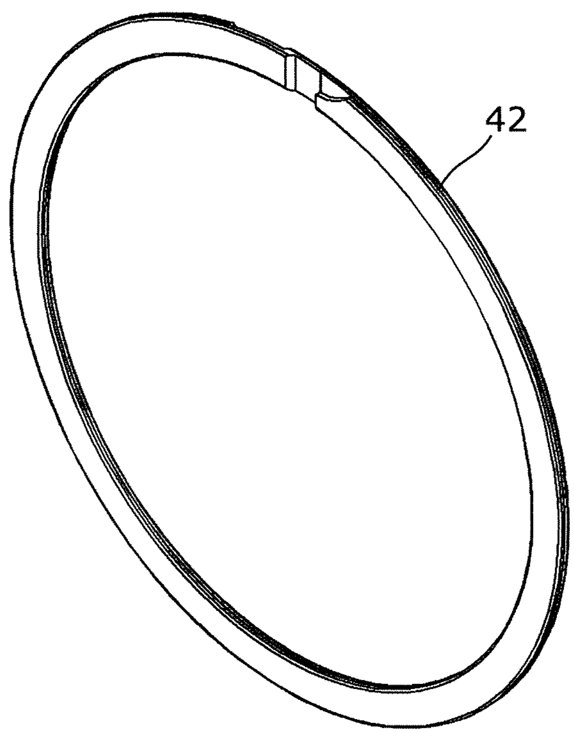

As noted above, the retractable dogs 46*b* are arranged in pairs 51, as illustrated in FIGS. 10 and 11. In this embodiment, each pair of retractable dogs 46*b* is located between a pair of adjacent fixed dogs 46*a*. In this embodiment, the two retractable dogs 46*b* that make up each pair 51 are mirror images of one another, and each individual retractable dog 46*b* is asymmetric. The retractable dogs 46*b* making up each pair 51 each include an outer face 62 and an inner face 64, wherein the inner faces 64 of each pair face inward towards one another. The outer faces 62 are designed to engage the first dogs 44 on the dog ring 24 and have profiles that are complementary to the profiles of the first dogs 44, in this embodiment being set at an acute angle relative to a radius of rotation to match the triangular shape of the first dogs 44. The outer face 62 of each retractable dog 46*b* comprises a torque drive face that is configured to transmit torque to the dog ring 24 when engaged with a first dog 44.

The inner face 64 of each retractable dog 46*b* includes a cam face 68 that is configured to drive axial movement of the retractable dog assembly towards the retracted position when engaged with a first dog. In this embodiment, the cam face 68 comprises a bevelled surface, which is inclined at an acute angle θ relative to a transverse plane of the dog clutch (the term "transverse plane" meaning in this context a plane that is perpendicular to the rotational axis Z of the drive shaft 26), as illustrated in FIG. 6*a*. The acute angle θ that is greater than 0° and less than 90°. Optionally, the acute angle θ is in the range 1°-85°, or optionally 5°-85°, or optionally 10°-50°, or optionally 20°-40°, for example about 30°. By contrast, the outer face 62 of each retractable dog 46*b* is substantially perpendicular to a transverse plane of the dog clutch.

Operation of the dog clutch will now be described with reference to FIGS. 6*a* to 6*e*. FIGS. 6*a* to 6*c* illustrate a gear change scenario during which the dog ring 24 is moved axially from a disengaged condition shown in FIG. 6*a*, through a partially engaged condition shown in FIG. 6*b* to a fully engaged condition shown in FIG. 6*c*. Arrows A illustrate relative rotation of the dog ring 24 and the dog gear assembly 22, and/or the direction of transmitted load/torque. In these figures, relative rotation of the dog ring 24 and the dog ring assembly 22 is represented as a linear movement for clarity and ease of understanding where for example the right hand direction represents clockwise rotation or torque, and the left hand direction represents anticlockwise rotation or torque.

In FIG. 6*a*, the dog ring 24 is separated from the dog gear assembly 22 in the axial direction X. The dog clutch is therefore in a disengaged condition and no load/torque is transmitted between the dog ring 24 and the dog gear assembly 22.

The dog ring 24 is rotating to the left (for example anticlockwise) relative to the dog gear assembly 22.

In FIG. 6*b* the dog ring 24 has been moved axially towards the dog gear assembly 22 (i.e. towards an engaged condition). However, the first and second dogs ill, 46 have not yet fully engaged, so at this stage no torque is transmitted directly between the dog ring 24 and the dog gear assembly 22.

One of the first dogs 44 on the dog ring 24 has however engaged one of the retractable dogs 46*b* of the retractable dog assembly 38. Relative rotation between the dog ring 24 and the dog gear assembly 22 causes the first dog 44 to slide over the cam face 68 of the engaged retractable dog 46*b*, forcing the retractable dog assembly 38 axially inwards towards the retracted position against the force of the control element 40, which in this embodiment is a compressed wave spring. This allows the dog ring 24 to continue to rotate relative to the dog gear assembly 22. As a result of the contact between the first dog 44 and the retractable dog 46*b*, a small amount of torque may be transmitted between the dog ring 24 and the retractable dog assembly 38.

In FIG. 6*c* the first dog 44 has rotated past the retractable dog 46*b*, allowing the retractable dog assembly 38 to return to the extended position under the influence of the control element 40. The first dog 44 now engages a fixed dog 46*a*, allowing it to transmit torque/rotary drive between the dog ring 24 and the dog gear assembly 22.

FIGS. 6*d* and 6*e* illustrate a scenario in which the dog clutch is in an engaged condition and there is a change in the direction of drive/torque transmission through the dog clutch, as may occur for example in a vehicle when the throttle is closed so that the torque transmitted through the dog clutch changes from forward drive to engine braking.

In FIG. 6*d* (which is identical to FIG. 6*c* described above), the first dogs 44 on the dog ring 24 are engaged with the fixed second dogs 46*a* on the dog gear assembly 22, to transmit drive/torque between the dog ring 24 and the dog gear assembly 22 (and vice versa). In this example, the dog ring 24 is transmitting torque to the left (anticlockwise) relative to the dog gear assembly 22.

When the direction of the transmitted torque reverses, for example when the throttle is closed or during engine braking, the dog ring 24 rotates in the opposite direction relative to the dog gear assembly 22, as illustrated in FIG. 6*d*. In this example, the dog ring 24 rotates to the right (clockwise) relative to the dog gear assembly 22.

Relative rotation of the dog ring 24 and the dog gear assembly 22 is limited by the retractable dog assembly 38, which is urged to the extended position by the control element 40. The dog ring 24 is only able to rotate through a short distance (i.e. a small angle), until the first dogs 44 come into engagement with the drive faces of the retractable dogs 46*b*, which are now in the extended position. The dog clutch can then transmit rotary drive/torque in the opposite direction. Because the dog ring 24 only rotates through a small distance before it re-engages the dog gear assembly 22, the change in the relative rotational speeds of the two parts of the transmission system is only small, resulting in a smooth reversal of torque.

On the other hand, during a gear change the risk of the change being rejected is also small because of the relatively large gap between the fixed second dogs 46*a*. The retractable second dogs 46*b* do not interfere with or block a gear change because they can retract when engaged by the first dogs, allowing the dog ring 24 to continue rotating relative to the dog gear assembly 22 until the first dogs 44 engage the fixed second dogs 46*a*.

Further, as illustrated in FIG. 6*b*, when the first dog 44 slides over the cam face 68 of the engaged retractable dog 46*b*, the retractable dog assembly 38 is pushed towards the retracted position (in the direction of arrow X). This movement is opposed by the operating member 40 (wave spring), which exerts a biasing force on the retractable dog assembly 38. This causes the retractable dog assembly 38 to exert a force on the first dog 44 via the cam surface 68 in a direction opposite to the direction of rotation (opposite direction of arrow A). As a result of the contact between the first dog 44 and the retractable dog 46*b*, a small amount of torque is transferred between the dog ring 24 and the retractable dog assembly 38. The relative rotational speed of the dog ring 24 and the dog gear assembly 22 is thus reduced by retractable dog assembly 38 before the first dogs 44 engage the fixed second dogs 46*a*, which reduces the shock of engagement.

A drive transmission apparatus comprising a dog clutch 120 according to a second embodiment of the invention is illustrated in FIGS. 15 to 24. The dog clutch 120 includes a dog gear assembly 122 and a dog ring 124, which are mounted on a rotary drive shaft 126. The rotary drive shaft 126 carries a hub 128, which has a plurality of first drive formations 130, for example splines or other formations, on its outer circumference. The splines 130 engage complementary second drive formations 132, for example grooves or other formations, on the inner circumference of the dog ring 124. The first and second drive formations compel the dog ring 124 to rotate with the drive shaft 126 but allow relative axial movement between the dog ring 124 and the drive shaft 126. This axial movement is controlled by a selector mechanism 133, for example a selector fork, that engages a radial flange 134 on the outer circumference of the dog ring 124. The dog gear assembly 122 carries a set of gear teeth 135 on its outer circumference for transmitting drive to another gear (not shown).

The dog gear assembly 122 is mounted on a plain part 126*a* of the drive shaft 126 that has no drive formations, and is configured to rotate freely relative to the drive shaft 126.

The dog gear assembly 122 includes a dog gear 136, a retractable dog assembly 138, a control element 140, which in this embodiment comprises a plurality of helical springs 140', and a retaining element 142, which in this embodiment comprises a plurality of bolts 142'.

The dog ring 124 carries a set of first dogs 144 and the dog gear assembly 122 carries a set of second dogs 146, which are engageable with the first dogs 144 to transmit rotary drive and torque between the dog ring 124 and the dog gear assembly 122. In this embodiment the first and second dogs 144, 146 are substantially triangular in cross section and extend in an axial direction from respective end faces of the dog ring 124 and the dog gear assembly 122. In this embodiment the apexes of the first dogs 144 point radially outwards and the apexes of the second dogs 146 point radially inwards. The first and second dogs 144, 146 thus have complementary shapes, enabling respective faces of the dogs to transmit torque and rotary drive between the dog ring 124 and the dog gear assembly 122. The first and second dogs may however have alternative cross sectional shapes (for example square, trapezoidal etc.).

The set of second dogs 146 includes a plurality of fixed dogs 146*a* that extend axially from an end face 147 of the dog gear 136, and a plurality of retractable dogs 146*b* that comprise part of the retractable dog assembly 138. The retractable dogs 146*b* are separate from one another and extend axially (i.e. in a direction parallel to the rotational axis Z of the drive shaft 126) from the annular support element 150 towards the dog ring 124.

In this embodiment, the retractable dog assembly 138 comprises eight retractable dogs 146*b*, which are arranged in four pairs 151 of dogs. Each retractable dog 146*b* is aligned with a respective pocket 152 that extends axially through the dog gear 136 and is configured to move axially between an extended position in which it extends axially beyond the end face 147 of the dog gear 136, and a retracted position in which it is positioned substantially flush with or below the end face of the dog gear 136. When the retractable dogs 146*b* are in the extended position they are able to engage the first dogs 144 provided on the dog ring 124. When the retractable dogs 146*b* are in the retracted position, they cannot engage the first dogs W.

The retractable dogs 146*b* are supported by an annular support element 150, which in this embodiment comprises an annular ring that is made for example of steel. The annular support element 150 may however be made of other materials and have different shapes. The control element 140 comprises a set of helical springs 140', which are compressed between the retractable dogs 146*b* and the annular support element 150, and provide an axial force that urges the retractable dogs 146*b* towards the extended position. The annular support element 150 is attached to the dog gear 136 by the retaining element 142, which in this embodiment comprises a plurality of bolts 142' that extend through bolt holes 153 in the annular support element 150 and engage threaded bores 155 in the rear face 156 of the dog gear 136.

The axial positions of the retractable dogs 146*b* relative to the dog gear 136 are controlled by the control element 140, which in this embodiment comprises a plurality of helical springs 140'. The control element 140 may alternatively take a number of different forms. For example, it may comprise different resilient elements such as a pneumatic springs, or it may comprise one or more actuators, which may be pneumatically, mechanically or electromagnetically controlled.

In this embodiment the control element 140, the annular support element 150 and the retaining element 142 are all accommodated within an annular recess 154 provided in a rear face 156 of the dog gear 136. The helical springs 140' urge the retractable dogs **146*b* axially towards the extended position, in which the retractable dogs 146*b* can engage the first dogs 144 on the dog ring 124**.

Figure 15:
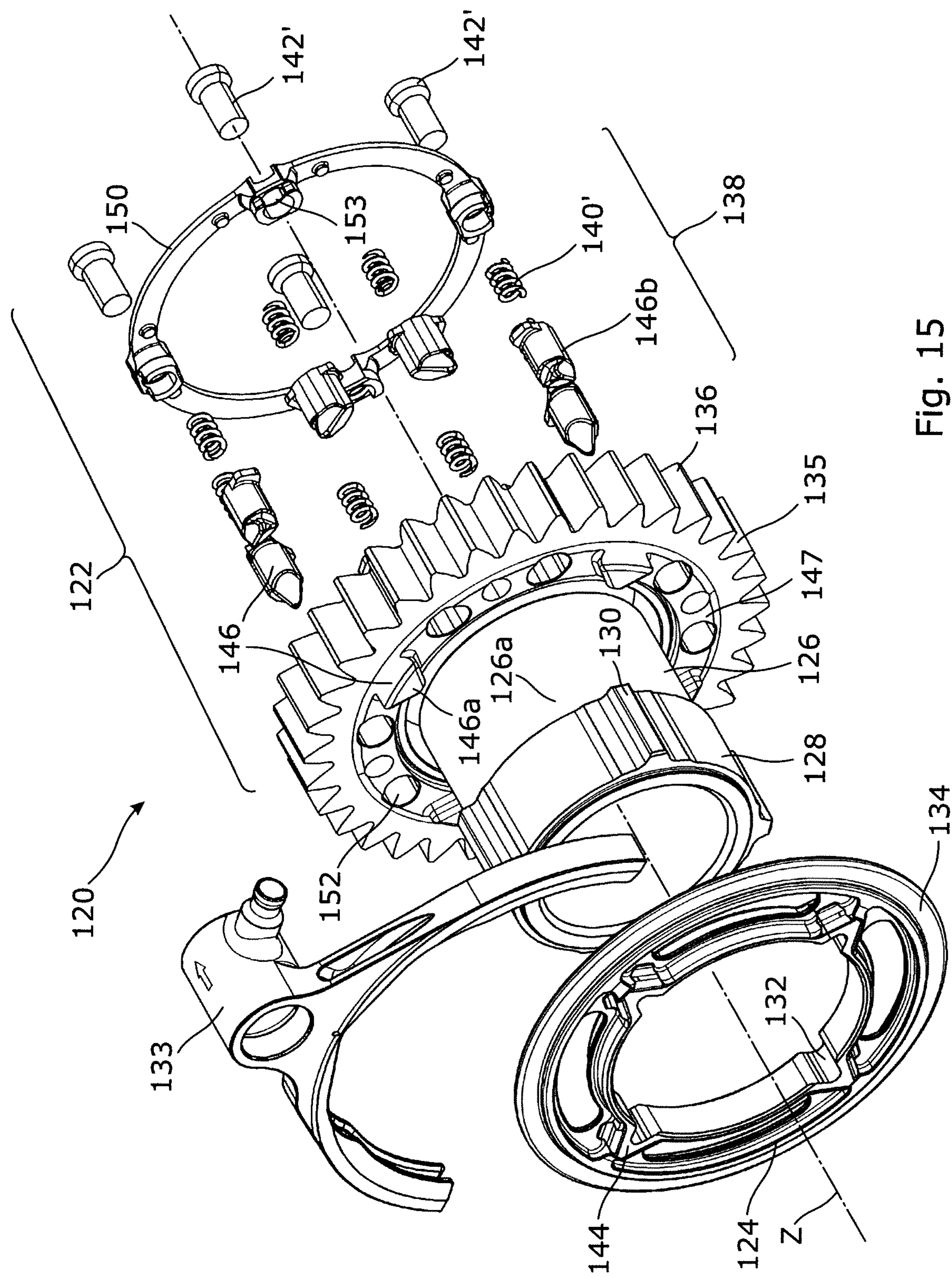
Figure 16:
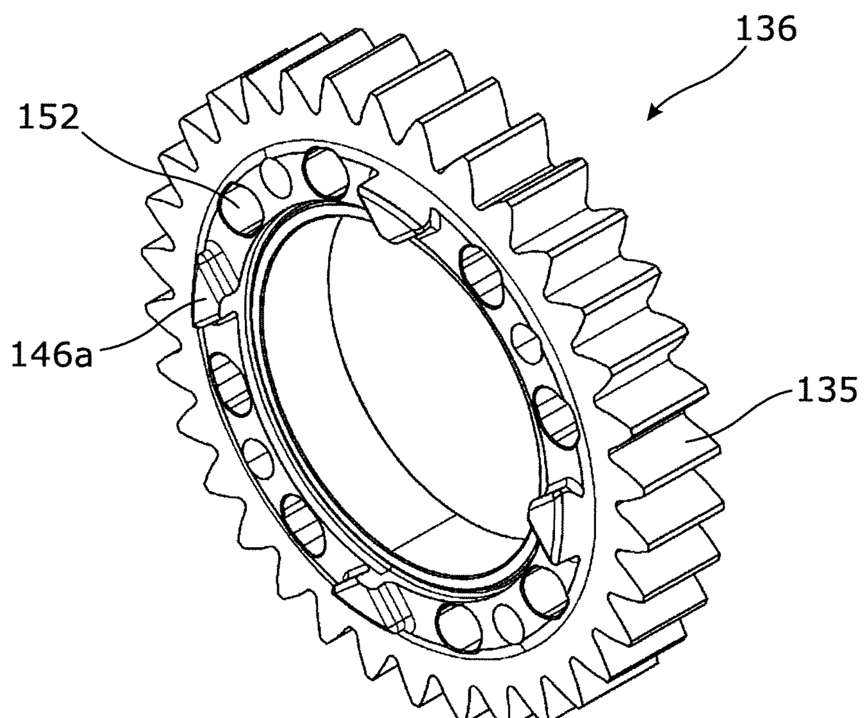
Figure 17:
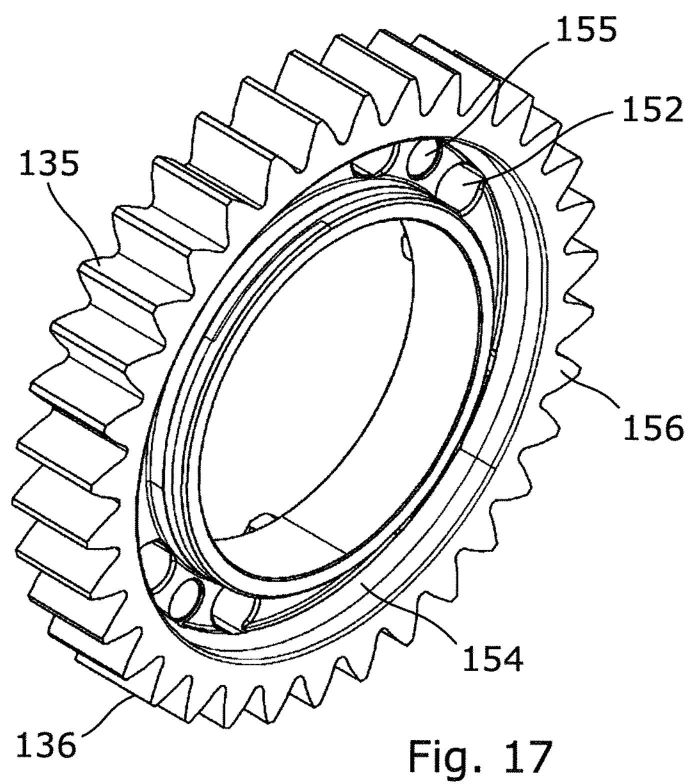
Figure 21:
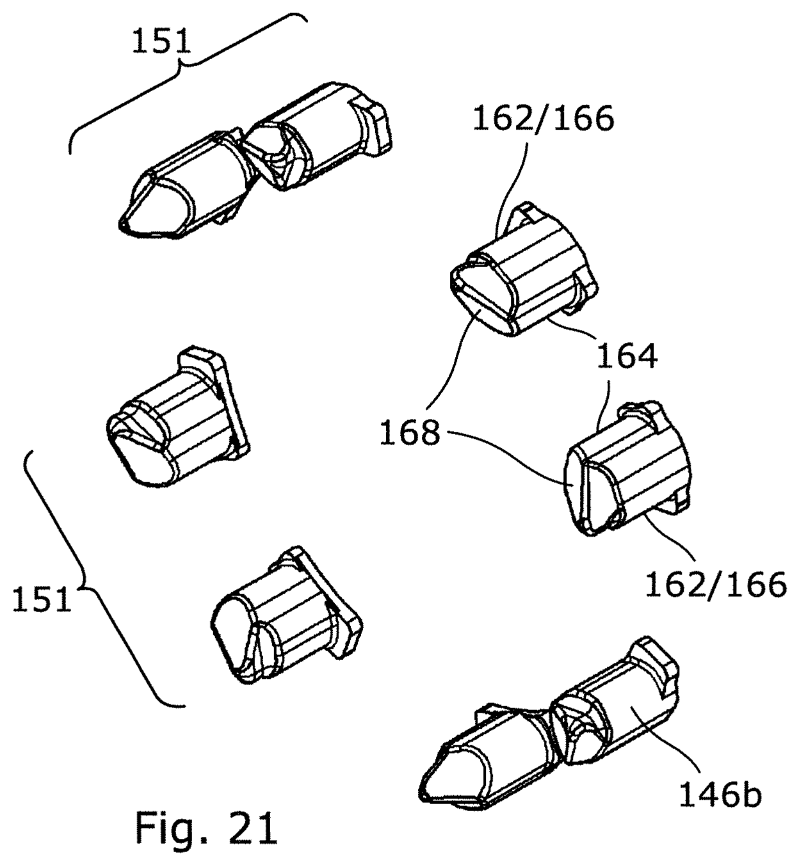
Figure 22:
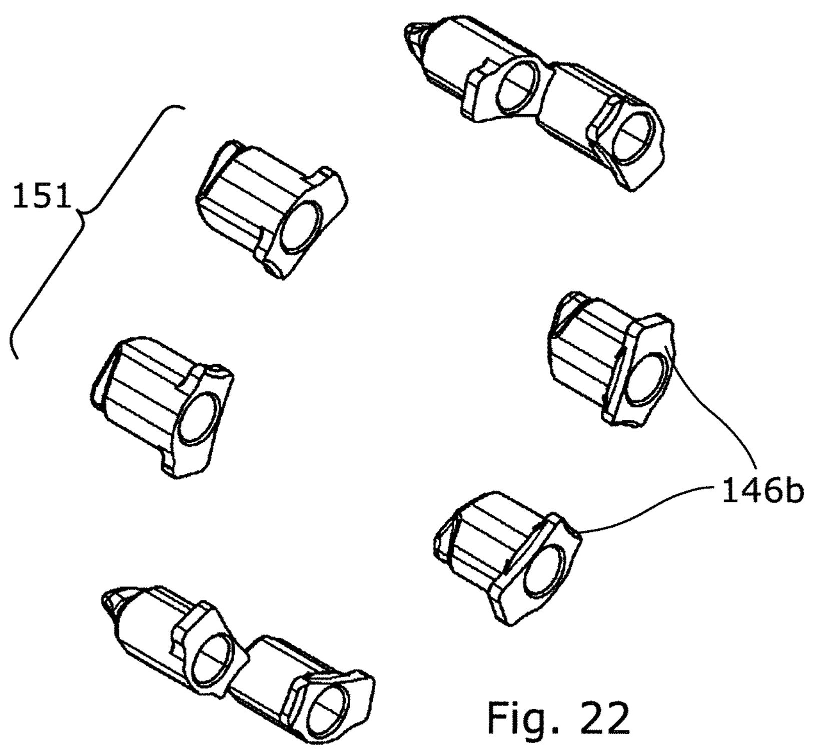
Figure 23:
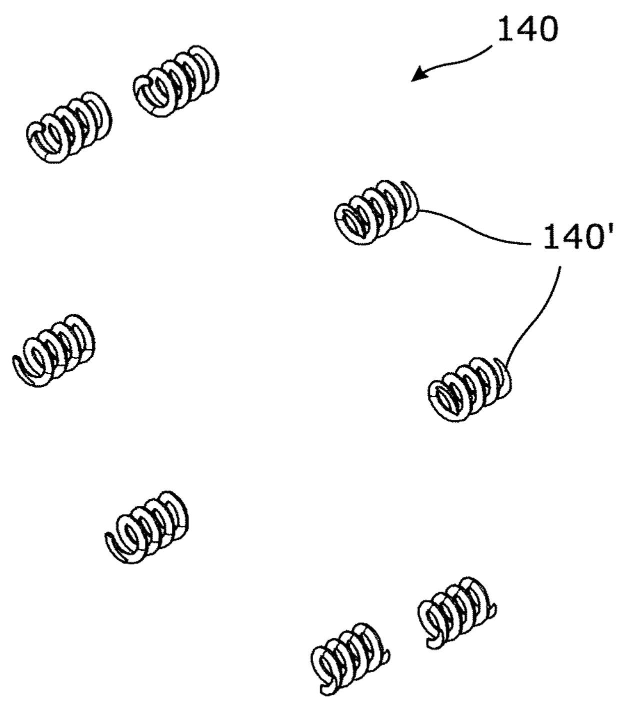
Figure 24:
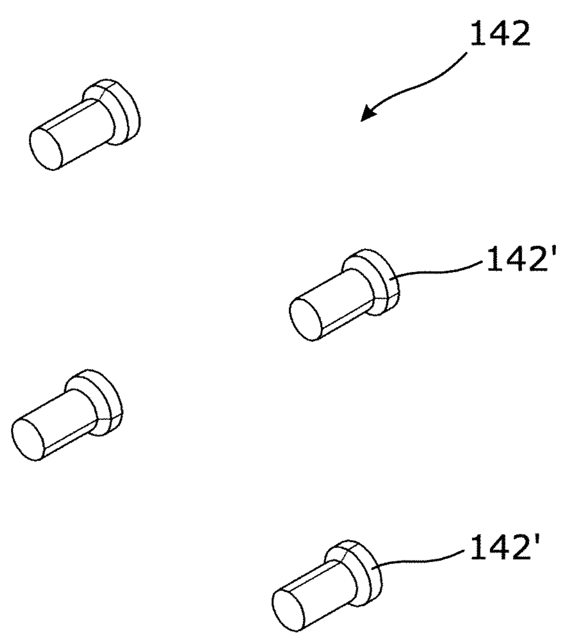

As noted above, the retractable dogs **146*b* are arranged in pairs 151, as illustrated in FIGS. 15, 21 and 22. In this embodiment, the two retractable dogs 146*b* that make up each pair 151 are mirror images of one another, and each individual retractable dog 146*b* is asymmetric. The retractable dogs 146*b* making up each pair 151 both include an outer edge 162 and an inner edge 164, wherein the inner edges 164 of each pair face inward towards one another. The outer edges 162 are designed to engage the first dogs 144 on the dog ring 124 and have complementary profiles, in this embodiment, being set at an acute angle relative to a radius of rotation to match the triangular shape of the first dogs 144. The outer face 162 of each retractable dog 146*b* comprises a torque drive face 166** that is configured to transmit torque to the dog ring when engaged with a first dog.

The inner face 164 of each retractable dog **146*b* includes a cam face 168 that is configured to drive axial movement of the retractable dog assembly towards the retracted position when engaged with a first dog. In this embodiment, the cam face 168 comprises a bevelled surface, which is inclined at an acute angle relative to a transverse plane of the dog clutch (the term "transverse plane" meaning in this context a plane that is perpendicular to the rotational axis Z of the drive shaft 126). By contrast, the outer face 162 of each retractable dog 146*b*** is substantially perpendicular to a transverse plane of the dog clutch.

Operation of the second dog clutch is similar to that of the first dog clutch, as described above with reference to FIGS. **6*a* to 6*e*. The only significant difference is that the retractable dogs 146*b*** are able to move independently of one another in the axial direction between the extended position and the retracted position, when they are engaged by the first dogs.

Similarly to the first dog clutch described above, in the second dog clutch the first dog 144 is biased towards the extended position by the force of the control element 140 (helical springs). As a result of the contact between the first dog 144 and the retractable dog **146*b*, a small amount of torque is transmitted between the dog ring 124 and the retractable dog assembly 138. The relative rotational speed of the dog ring 124 is thus reduced by retractable dog assembly 138 before the first dogs 144 engage the fixed second dogs 146*a***, which reduces the shock of engagement.

Various modifications of the first and second dog clutches are possible, some of which will now be described.

In the two embodiments described above, the control elements 40,140 that bias the retractable dog assemblies 38,138 in the axial direction are respectively a wave spring and helical springs, but other types of resilient members (rubber block, etc.) and actuators may alternatively be used.

Further, in the above two embodiments, an annular member having a circular outer periphery is used as the dog ring 24,124. Alternatively, a sliding dog with a different outer circumferential shape may be used (for example, with radial drive formations), or another gear adjacent to the dog gear assembly 22,122 may be used, provided that the dog is also rotated with the drive shaft, is axially slidable relative to the drive shaft, has dogs that are axially movable to engage and disengage the second dogs 44, 46,144,146 of the dog gear assembly, and the dogs engage each other to transmit torque and rotation of the drive shaft to the dog gear assembly 22,122.

It is also possible to configure the retractable dog assembly for non-axial movement relative to the dog gear between the extended position and the retracted position, for example through movement in a radial or circumferential direction, etc.

The invention claimed is:

1. A drive transmission apparatus comprising a dog clutch comprising:

a dog gear assembly, and a dog ring, wherein the dog gear assembly and the dog ring are configured for rotation about a rotational axis, and for relative axial adjustment between an engaged condition in which torque can be transmitted between the dog gear assembly and the dog ring, and a disengaged condition in which torque cannot be transmitted, wherein the dog gear assembly includes:

a dog gear, a retractable dog assembly configured for movement relative to the dog gear between an extended position and a retracted position, and a control element that controls movement of the retractable dog assembly, wherein the dog ring comprises a plurality of first dogs, and the dog gear assembly comprises a plurality of second dogs, wherein the second dogs are configured to engage the first dogs in the engaged condition to transmit torque between the dog ring and the dog gear assembly, and are disengaged from the first dogs in the disengaged condition, said second dogs including a plurality of fixed dogs that are mounted on the dog gear, and a plurality of retractable dogs that comprise the retractable dog assembly, wherein each retractable dog has a torque drive face that is configured to transmit torque to the dog ring when engaged with a first dog, and a cam face that is configured to drive movement of the retractable dog assembly towards the retracted position when engaged with a first dog, whereby, when said first dog is engaged with the cam face, relative rotation between the dog ring and the dog gear assembly causes the engaged first dog to slide over the cam face of the engaged retractable dog, driving movement of the retractable dog assembly towards the retracted position.

2. A drive transmission apparatus according to claim 1, wherein the retractable dog assembly is configured for axial movement relative to the dog gear between an extended position and a retracted position, and the control element controls axial movement of the retractable dog assembly.

3. A drive transmission apparatus according to claim 2, wherein the fixed dogs and the retractable dogs extend axially a substantially equal distance from the dog gear when the retractable dog assembly is in the extended position.

4. A drive transmission apparatus according to claim 1, wherein the retractable dog assembly is configured such that torque can be transmitted between the retractable dogs and the first dogs when the retractable dog assembly is in the extended position, and torque cannot be transmitted between the retractable dogs and the first dogs when the retractable dog assembly is in the retracted position.

5. A drive transmission apparatus according to claim 1, wherein the torque drive face is substantially perpendicular to a transverse plane of the dog clutch.

6. A drive transmission apparatus according to claim 1, wherein the cam face is inclined at an acute angle θ relative to a transverse plane of the dog clutch, wherein the acute angle θ is greater than 0° and less than 90°, optionally wherein the acute angle θ is in the range 1°-85°, or optionally 5°-85°, or optionally 10°-50°, or optionally 20°-40°.

7. A drive transmission apparatus according to claim 1, wherein the retractable dogs are asymmetric and are arranged in pairs, wherein the torque drive faces comprise outer faces of each pair of retractable dogs, and the cam faces comprise inner faces of each pair of retractable dogs.

8. A drive transmission apparatus according to claim 7, wherein each pair of retractable dogs is located between adjacent fixed dogs.

9. A drive transmission apparatus according to claim 1, wherein each retractable dog extends through a pocket in the drive gear dog gear.

10. A drive transmission apparatus according to claim 1, wherein the retractable dog assembly comprises a support element, and the retractable dogs are mounted on the support element, and optionally wherein the control element is configured to control movement of the support element.

11. A drive transmission apparatus according to claim 1, wherein the retractable dogs are configured to move independently of one another between the extended position and the retracted position, and optionally wherein the control element is configured to control movement of the retractable dogs.

12. A drive transmission apparatus according to claim 1, wherein the control element comprises a resilient biasing means that urges the retractable dog assembly towards the extended position.

13. A drive transmission apparatus according to claim 1, wherein the control element comprises an actuator that is operable to control movement of the retractable dog assembly between the extended position and the retracted position.

14. A drive transmission apparatus according to claim 1, wherein the dog gear includes a recess that accommodates the retractable dog assembly, optionally further comprising a retaining element that retains the retractable dog assembly within the recess.

15. A drive transmission apparatus according to claim 1, wherein said drive transmission apparatus is included in a transmission system comprising a drive shaft that is rotatable about a shaft axis, wherein the dog gear assembly and the dog ring are configured for rotation about the shaft axis, the dog gear assembly is rotatable relative to the drive shaft, and the dog ring is configured for rotation with the drive shaft.

16. A drive transmission apparatus as set forth in claim 15, wherein the drive shaft and the dog ring include mutual drive formations that permit relative axial movement between the dog ring and the drive shaft and prevent relative rotation between the dog ring and the drive shaft.

17. A drive transmission apparatus as set forth in claim 16, further comprising a selector mechanism that controls relative axial movement between the dog ring and the drive shaft.

18. A drive transmission apparatus according to claim 1, wherein the retractable dogs are arranged in pairs, each pair of retractable dogs located between a pair of adjacent fixed dogs, the retractable dogs making up each pair each include an outer face and an inner face wherein the inner faces of each pair face inward towards one another, the outer faces are designed to engage the first dogs on the dog ring and have profiles that are complementary to the profiles of the first dogs, the outer face of each retractable dog comprises a torque drive face that is configured to transmit torque to the dog ring when engaged with a first dog, and the inner face of each retractable dog includes a cam face that is configured to drive axial movement of the retractable dog assembly towards the retracted position when engaged with a first dog.

19. A drive transmission apparatus according to claim 18, wherein the cam face is inclined at an acute angle greater than 0° and less than 90° to a transverse plane of the dog clutch, and the two retractable dogs that make up each pair are mirror images of one another.

20. A drive transmission apparatus comprising a dog clutch comprising:

a dog gear assembly, and a dog ring, wherein the dog gear assembly and the dog ring are configured for rotation about a rotational axis, and for relative axial adjustment between an engaged condition in which torque can be transmitted between the dog gear assembly and the dog ring, and a disengaged condition in which torque cannot be transmitted, wherein the dog gear assembly includes:

a dog gear, a retractable dog assembly configured for movement relative to the dog gear between an extended position and a retracted position, and a control element that controls movement of the retractable dog assembly, wherein the dog ring comprises a plurality of first dogs, and the dog gear assembly comprises a plurality of second dogs, wherein the second dogs are configured to engage the first dogs in the engaged condition to transmit torque between the dog ring and the dog gear assembly, and are disengaged from the first dogs in the disengaged condition, said second dogs including a plurality of fixed dogs that are mounted on the dog gear, and a plurality of retractable dogs that comprise the retractable dog assembly, wherein each retractable dog has a torque drive face that is configured to transmit torque to the dog ring when engaged with a first dog, and a cam face that is configured to drive movement of the retractable dog assembly towards the retracted position when engaged with a first dog, whereby relative rotation between the dog ring and the dog gear assembly causes the engaged first dog to slide over the cam face of the engaged retractable dog, driving movement of the retractable dog assembly towards the retracted position;

wherein the first dogs are substantially triangular in cross section and extend in an axial direction from respective end faces of the dog ring, wherein the apexes of the first dogs point radially outwards, wherein the retractable dogs include an outer face, wherein the outer faces of the retractable dogs are designed to engage the first dogs on the dog ring and have profiles that are complementary to the profiles of the first dogs and being set at an acute angle relative to a radius of rotation to match the triangular shape of the first dogs, wherein the outer face of each retractable dog comprises a torque drive face that is configured to transmit torque to the dog ring when engaged with a first dog.

* * * * *